United States Patent [19]
Cheal et al.

[11] 3,877,002
[45] Apr. 8, 1975

[54] INTRUSION DETECTING SYSTEM

[75] Inventors: James Cheal, Plymouth; Larry Eccleston, Dundee, both of Mich.

[73] Assignee: Omni Spectra, Inc., Farmington, Mich.

[22] Filed: May 25, 1973

[21] Appl. No.: 363,808

[52] U.S. Cl. ......... 340/258 R; 343/5 PD; 343/5 SM
[51] Int. Cl. ............................................. G08b 13/24
[58] Field of Search ........ 340/258 A, 258 B, 258 R, 340/258 C; 343/5 PD, 5 SM

[56] References Cited
UNITED STATES PATENTS

| | | | |
|---|---|---|---|
| 2,203,807 | 6/1940 | Wolff | 340/258 B |
| 2,538,028 | 1/1951 | Mozley | 343/5 AG |
| 3,237,105 | 2/1966 | Kalmus | 340/258 C |
| 3,419,847 | 12/1968 | Bonney | 340/258 R |
| 3,618,083 | 11/1971 | Burley et al. | 340/258 A X |
| 3,618,091 | 11/1971 | Butler | 343/16 M |
| 3,696,368 | 10/1972 | Kauffman | 340/258 A |

Primary Examiner—David L. Trafton
Attorney, Agent, or Firm—Harness, Dickey & Pierce

[57] ABSTRACT

An intrusion detecting system including a transmitting unit for radiating microwave energy along a preselected path which is amplitude modulated at a preselected frequency, and a receiving unit positioned on the path and separated from the transmitting unit for receiving a portion of the radiated microwave energy which includes a signal processing circuit which distinguishes between radiated signals which are amplitude modulated at said preselected frequency and other radiated signals and which provide an output signal to an alarm device or the like when the received portion of the radiated microwave energy is additionally amplitude modulated in a manner characteristic of an intrusion. The signal processing circuit includes a dual rate automatic gain control which responds to increases in the receiving unit signals at a fast rate and responds to decreases in the receiving unit signals at a second substantially slower rate.

4 Claims, 4 Drawing Figures

INTRUSION DETECTING SYSTEM

BACKGROUND AND SUMMARY OF THE INVENTION

The present invention relates to high frequency intrusion detecting systems which use a transmitting unit for radiating high frequency energy in a well defined radiation pattern and an associated receiving unit which has a well defined reception pattern and which receives a portion of the radiated microwave energy. The receiving unit is spaced from the transmitting unit so that the interposition of an intruder therebetween causes amplitude modulation of the received portion of the microwave energy which is detectable to sound an alarm.

According to the present invention, the radio frequency energy provided by the transmitting unit is amplitude modulated at a relatively low frequency, e.g., 3, 5, 8 or 13 kilohertz and the receiving unit associated with each transmitter is adapted to respond to received signals which are amplitude modulated at the frequency of modulation provided by the transmitting unit. Accordingly, each receiving unit may be adapted to respond to only one transmitting unit.

The signal processing circuit of the receiving unit of this invention includes a dual rate automatic gain control, i.e., one which adjusts automatically to increases in the signal representing power levels received at the receiving unit at a first rate and decreases in that signal at a second, substantially lower rate. Consequently, the automatic gain control amplifier provides a changing output signal only when increasing signals increase at a rate which exceeds the higher first rate and decreasing signals decrease at a rate which exceeds the lower second rate. Hence, the system has a greater response to decreasing signals representative of the received energy level or amount. For example, the response rates of the automatic gain control may differ by a multiple of 10 or more. It has been found that the dual rate automatic gain control enhances the detection capability of the unit since it tends to reduce amplifier gain with the small increases in the signal due to the multipath effect as an intruder nears the microwave beam between the transmitting unit and the receiving unit. This causes increased sensitivity to decreases in the signal as the energy transmitted from the transmitting unit to the receiving unit is partially attenuated as the intruder enters the beam. Additionally, by virtue of the automatic gain control, the intrusion detecting system will automatically compensate for gradual changes in the level of the microwave energy received by the receiving unit due to rain, component aging, etc. Still additionally, the initial setup of the intrusion detecting system of this invention is simplified through the incorporation of the automatic gain control since a range adjustment is not required. Initial setup of the intrusion detecting system of this invention is further simplified by providing a transmitting unit which radiates circularly polarized microwave energy so that the receiving unit may equally effectively receive energy from the transmitting unit regardless of its rotational alignment with the transmitting unit once it is axially aligned with the transmitting unit. Importantly, the intrusion detecting system of this invention is self-supervising. That is, a failure of the transmitting unit to radiate appropriate signals or a failure of the receiving unit to receive and detect those signals appears to the signal processing circuitry as a signal transmission blockage thereby resulting in an alarm signal.

Other features and advantages of the intrusion detecting system according to the present invention will be apparent in view of the Detailed Description of the Preferred Embodiment hereinafter.

DETAILED DESCRIPTION OF THE PREFERRED EMBODIMENT

Figure 1:
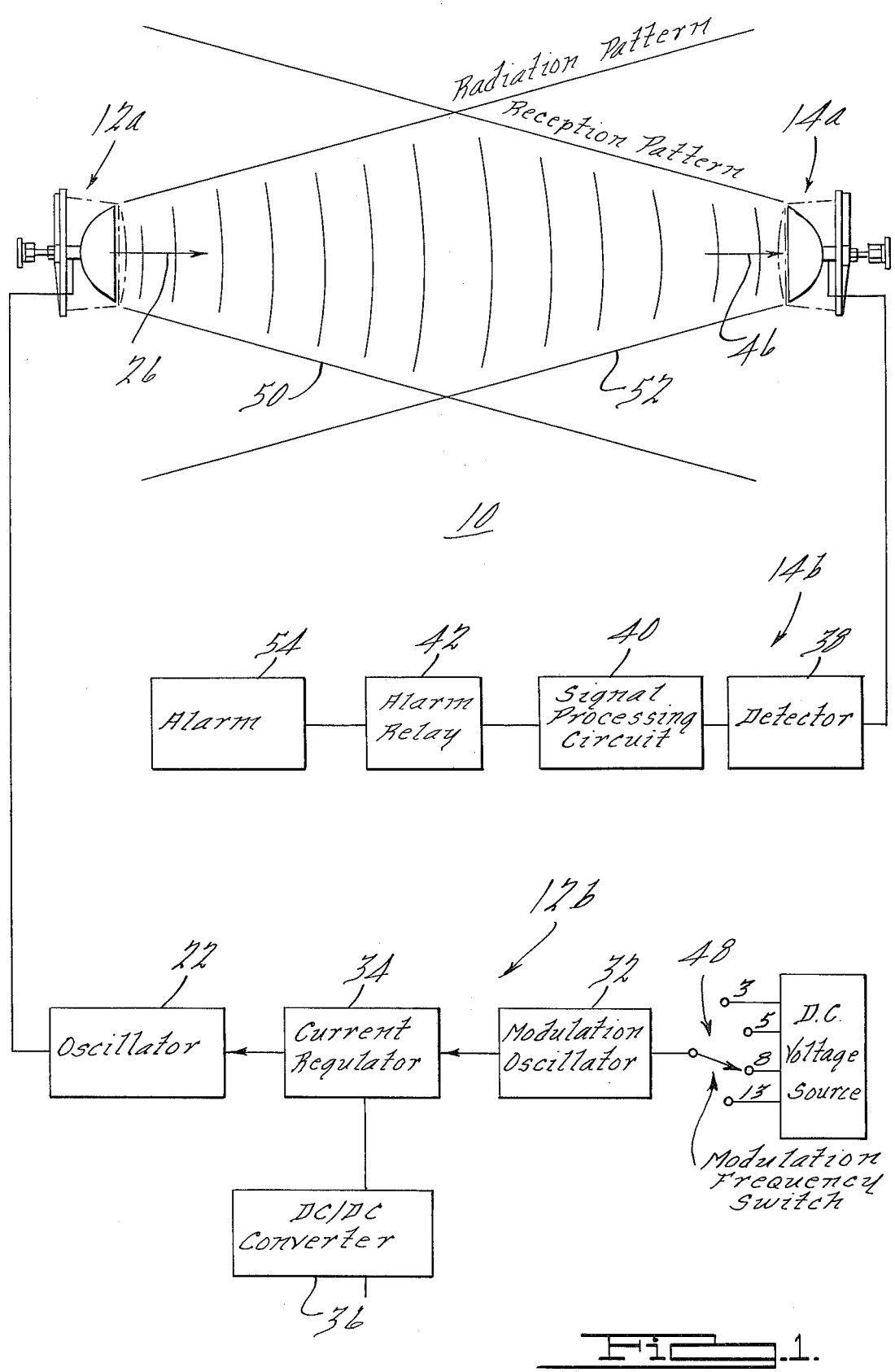
FIG. 1 is an overall block diagram of an exemplary intrusion detecting system according to the present invention.
Figure 2:
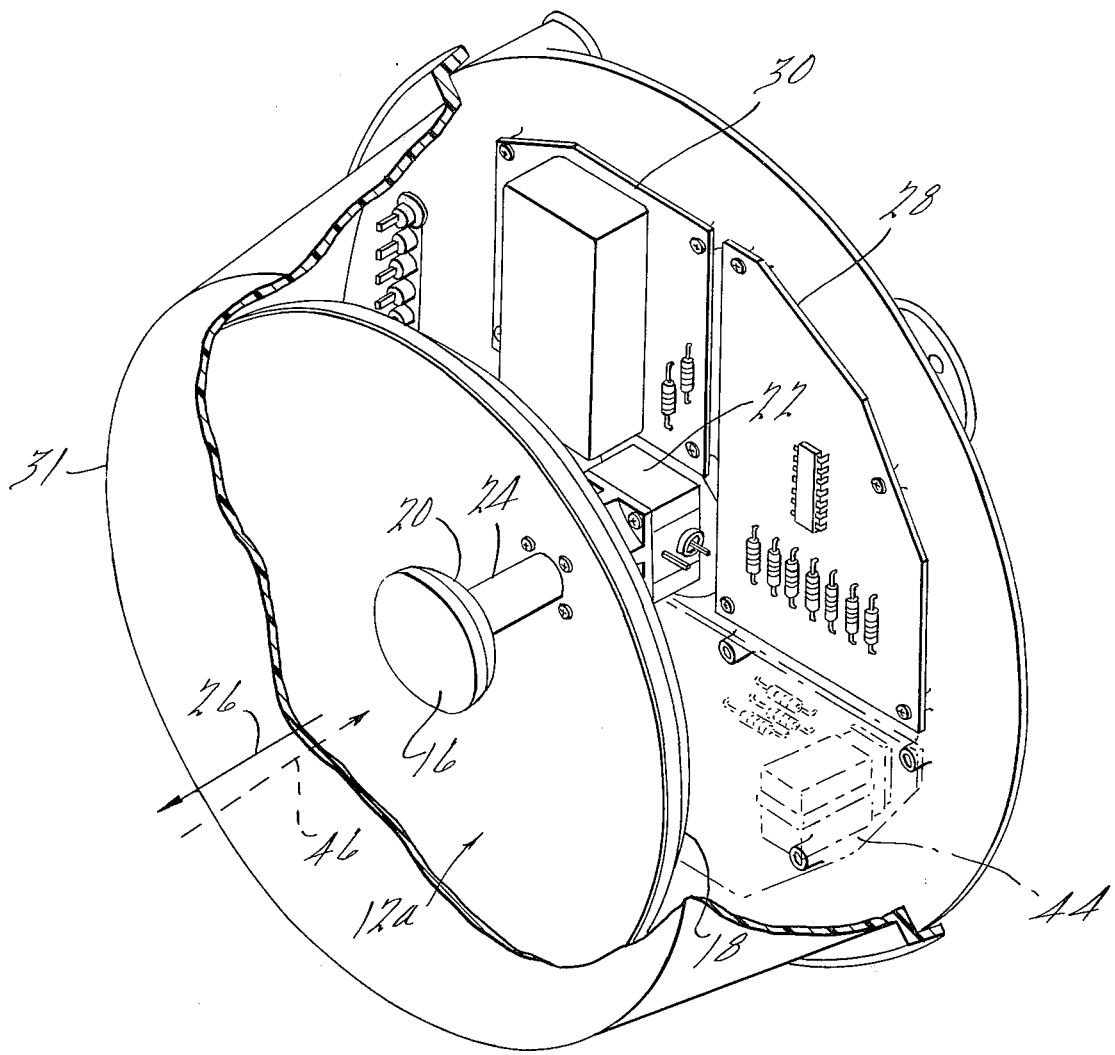
FIG. 2 is a perspective illustration of a transmitting unit of the exemplary intrusion detecting system of this invention including an illustration by dashed lines of a substitute signal processing unit utilized to adapt the unit shown to function as a receiving unit for the exemplary intrusion detecting system of this invention.

In FIG. 1, an exemplary embodiment of an intrusion detecting system 10 is illustrated. The intrusion detecting system 10 includes a transmitting unit 12 having an antenna assembly 12a and a source 12b of amplitude modulated high frequency energy such as microwave energy and a receiving unit 14 having an assembly antenna 14a and intrusion detecting circuitry 14b. The transmitting unit antenna assembly 12a can be best seen with reference to FIG. 2 in which a cut-away perspective illustration of the antenna assembly 12a is provided. The antenna assembly 12a is seen to comprise a splash plate 16 which is fixedly supported with respect to a dish-type deflector 18 by a high density dielectric support member 20. Microwave energy is generated within an oscillator 22 and is fed to the splash plate 16 through a cylindrical wave guide 24. The microwave energy is reflected from the splash plate 16 onto the dish 18, and outwardly therefrom in the direction of the arrow 26. With reference also to FIG. 1, the source components shown at circuit boards 28 and 30 include a modulation oscillator 32, a current regulator 34, and a DC converter 36.

The receiving antenna structure 14a is similar to the transmitting antenna structure 12a in that it includes a splash plate 16, a dish reflector 18, a dielectric support member 20, and a cylindrical wave guide 24. However, rather than having an oscillator 22, it includes a detector 38, a signal processing circuit 40, and an alarm relay 42. The detector 38 is preferably appended to the antenna structure 14a while the signal processing circuit 40 and the alarm relay 42 may be disposed on a circuit board at 44 (shown in dashed outlines). The receiver receives microwave energy in the direction of arrow 46 which is reflected from the dish 18 onto the splash plate 16, and therefrom, through the wave guide 24 to the receiver 38. Additional detail with respect to many of the components of the transmitter and receiver of this invention can be obtained by reference to the copending application of Cheal, et al., entitled "Intrusion Detection System," Ser. No. 237,745, filed Mar. 24, 1972, and the copending application of Cheal, Ser. No. 242,610, filed Apr. 10, 1972, each or which shows a transceiver having a transmitting unit and a receiving unit. The disclosures of the above applications are incorporated herein by reference thereto.

In the operation of the intrusion detecting system 10, power is supplied to the oscillator 22 by the current regulator 34. Preferably, the oscillator 22 is an Impatt diode which operates in the "X-band" range of frequencies, e.g., at 10.525 giggahertz. The level of current delivered to the Impatt diode of the oscillator 22 from the DC-to-DC converter through the current regulator 34 is modulated under the control of a modulation oscillator 32 so that the level of the current delivered to the Impatt diode varies at either 3, 5, 8 or 13 kilohertz, depending upon the position of the modulation frequency switch 48. For example, the switch 48 may be effective to connect the modulation oscillator to one of four DC control voltages and the modulation oscillator 32 may be a voltage controlled oscillator. This modulation of the level of current into the Impatt diode in accordance with the frequency of oscillation of the modulation oscillator 34 correspondingly varies the amplitude of the output waveform of the Impatt diode at the modulation frequency whereby the Impatt diode provides an output waveform which may be considered to have an X-band carrier frequency with a side band of 3, 5, 8 or 13 kilohertz. The frequencies of 3, 5, 8 and 13 kilohertz are chosen since they are not harmonically related, and consequently, transmitter/receiver links at one frequency should not interfere with other transmitter/receiver links at the other frequencies through harmonic responses.

The composite signal of the carrier frequency and the sideband frequency is radiated from the transmitting unit antenna structure 12a in the direction of the receiving unit antenna structure 14a so that at least a portion of the composite signal is received by the receiving unit antenna structure 14a. The signal received at the receiver antenna 14a is in turn received by a detector 38 which is preferably a Schottky diode. The Schottky diode acts as a radio frequency detector to remove the X-band carrier frequency to provide a signal at the detector output which is received by the signal processing circuit 40 and which is representative of the sideband and any additional modulation, for example, due to the presence of an intruder in the transmission path between the transmitting unit antenna structure 12a and the receiving unit antenna structure 14a. This transmission path is generally delineated by a radiation pattern outline 50 and a reception pattern outline 52, and particularly, the transmission path essentially includes the area common to both the radiation pattern 50 and the reception pattern 52. The signal processing circuit 40 detects when the signal from the detector 38 is characteristic of an intruder in the aforementioned intrusion area and provides an output signal to an alarm relay which in turn provides an output signal to an alarm 54 which signals the presence of an intruder.

Figure 3:
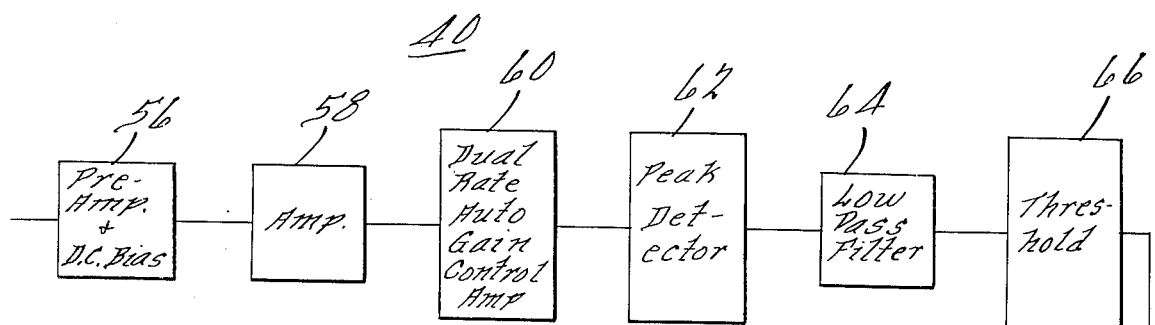
FIG. 3 is a block diagram of the signal processing circuit of the receiving unit of the intrusion detecting system of FIG. 1.

With reference now to FIG. 3, an exemplary signal processing circuit 40 is shown in greater detail. A pre-amplifier and DC bias circuit 56 amplifies the relatively weak signal from the Schottky detector diode. For example, the pre-amplifier may provide a 26 db gain between 500 hertz and 20 kilohertz. The pre-amplifier and DC bias circuit 56 also provides a suitable DC voltage for the Schottky detector diode. A second amplifying stage 58 provides voltage amplification of the output signal of the pre-amplifier and DC bias circuit 56, and preferably, provides a 10 db gain. A dual rate automatic gain control amplifier 60 receives the output signal from the amplifier 58 and provides a highly amplified signal at its output, e.g., up to 70 db above the input signal. The dual rate automatic gain control amplifier 60 automatically adjusts its gain so that its output is held constant when the rate of decrease of the input signal is below approximately 0.6 db per second or if the rate of increase of the input signal is below approximately 6.0 db per second. In this regard, as an intruder approaches the intrusion zone defined by transmission and reception patterns 50 and 52, an initial increase in the signal received by the receiver 14 occurs by virtue of the multipath effect. More particularly, some of the energy from the transmitter 12, which would not ordinarily be received by the receiver 14, is reflected or refracted from the intruder so as to be diverted to the receiver 14 thereby increasing the total level or amount of microwave energy which is received by the receiver 14. This increase in total energy level is seen as an increasing signal at the automatic gain control amplifier 60. This increase in signal causes a reduction in gain as the intruder approaches the intrusion zone, which enhances the decrease in signal due to the attenuation of the microwave energy received by the receiver 14 from the transmitter 12 as the intruder actually enters the intrusion zone and blocks or absorbs some of the microwave energy. Consequently, the rates of response of the automatic gain control amplifier 60 to increasing and decreasing input signals are selected so that the intrusion detecting system 10 effectively adds the signal increase due to the multipath effect as the intruder approaches the intrusion zone, to the signal decrease due to the attenuation of the signal received at the receiver 14 as the intruder enters the intrusion zone and absorbs a portion of the transmitted radiation so as to enhance the responsiveness of the intrusion detecting system 10 to an actual intrusion in the intrusion zone. The automatic gain control amplifier 60 also simplifies the initial setup of the intrusion detecting system 10 since it automatically adjusts its gain or transfer characteristic in accordance with signal level variations due to variations in range or distance between the transmitting unit and the receiving unit so that its output signal has a given value regardless of the distance between the transmitting unit and the receiving unit. Moreover, the automatic gain control amplifier 60 automatically compensates for slow changes in signal levels due to rain, dust, component aging, etc. Still additionally, the automatic gain control amplifier is useful in providing a means to discount or ignore very slow moving objects which could not reasonably be assumed to be an "intruder."

The output signal of the automatic gain control amplifier 60 is received by a peak detector 62 which is responsive to signals at the sideband or identification frequency and which provides an output signal which represents the envelope of the sideband frequency waveform thereby demodulating the sideband signal to provide a signal representative of variations in amplitude of the received signal which are due to other effects including the presence of an intruder.

The low pass filter 64 receives the signal from the peak detector 62 and provides a signal at its output if the signal from the peak detector 62 is sufficiently low frequency which is characteristic of the presence of an intruder in the intrusion zone. More particularly, the low pass filter 64 may be a three-pole low pass filter which passes frequencies between 0 and 10 hertz. The 10 hertz cutoff is chosen so that extraneous and random signals which may be received by the low pass filter 64 will be blocked, and hence, ignored. Additionally, signals created by fast moving objects such as birds and certain animals will be ignored. A threshold detector 66 receives the demodulated signal from the low pass filter 64 and provides an output signal to an alarm relay 42 when the output signal of the low pass filter 64 exceeds the threshold of the threshold detector 66. The threshold represents a preselected magnitude of signal which can be expected of an actual undesirable intrusion. The alarm relay 42 is effective to activate an external alarm 54 when it receives a signal from the threshold detector 66.

Figure 4:
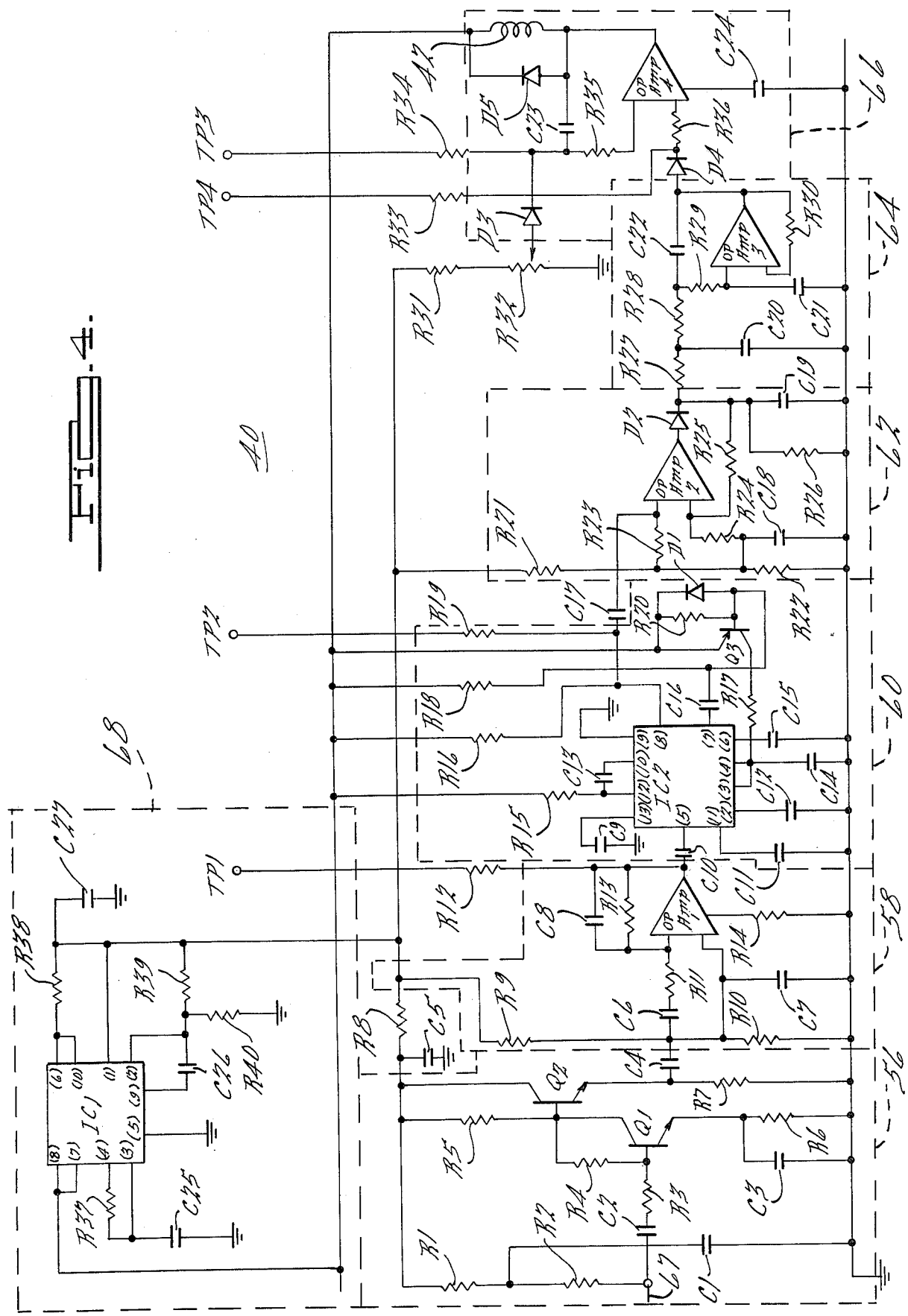
FIG. 4 is a circuit diagram of the signal processing circuit of FIG. 3.

In FIG. 4, an exemplary embodiment of the signal processing circuit of FIG. 3 is illustrated. Dashed outlines represent the pre-amplifier and DC bias 56, the amplifier 58, the dual rate automatic gain control amplifier 60, the peak detector 62, the low pass filter 64 and the threshold circuit 66. The output signal from the detector 38 is received at the pre-amplifier and DC bias on line 67. The DC bias is provided to the detector diode via resistors R1 and R2 which are connected to the line 67. The output signal of the signal processing circuit is provided to the alarm relay coil 42. Also shown in FIG. 4 is a power supply 68 for the signal processing circuit.

A test point terminal TP1 is provided so that the output of the amplifier section 58 may be sampled, a test point terminal TP2 is provided so that the output of the dual rate gain control may be sampled, a test point terminal TP3 is provided so that the threshold level as set by variable resistor R32 may be sampled, and a test point terminal TP4 is provided so that the output signal of the low pass filter may be sampled.

IC2 is used as a dual rate automatic gain control, and particularly, is associated with resistor R17 and capacitor C14 which are used to establish the signal at pins 3 and 4 of the IC2 so as to in turn establish the response of the automatic gain control to increasing signal levels at its input pin 5. More particularly, for increasing signals, the capacitor C14 is charged through the resistor R17 and the transistor Q3, which in turn is controlled by the signal from pin 7 and capacitor C16. For decreasing signals, the capacitor C14 is gradually discharged into pins 3 and 4 of IC2 and is partially controlled in this regard through the action of the transistor Q3 so as to establish the responsiveness of the automatic gain control amplifier IC2 to decreasing signals at pin 5. The transistor Q3 provides a controlled decay of the capacitor C14 into the pins 3 and 4 which otherwise may vary due to changes in the internal resistance of the IC2 at pins 3 and 4 with changes in temperatures. Additionally, the internal resistance of the IC2 at pins 3 and 4 may differ between individual IC2's. The response of the IC2 to decreasing signals at pin 5 can also be changed by connecting a resistor in parallel with the capacitor C14 or by connecting an emitter follower amplifier in series with the parallel combination of the capacitor C14 and the aforementioned resistor.

In the exemplary circuit shown in FIG. 4, the following circuit values were used:

RESISTORS

| | | |
|---|---|---|
| R1-32K Ohms | R13-47K | R25-500K |
| R2-10K | R14-270K | R26-10K |
| R3-200 | R15-1K | R27-10K |
| R4-20K | R16-1K | R28-10K |
| R5-33K | R17-1K | R29-10K |
| R6-4.7K | R18-1K | R30-27K |
| R7-22K | R19-47K | R31-10K |
| R8-1K | R20-2.7K | R32-5K |
| R9-4.7K | R21-5.6K | R33-47K |
| R10-4.7K | R22-2.2K | R34-47K |
| R11-4.7K | R23-100K | R35-100K |
| R12-47K | R24-100K | R36-100K |

CAPACITORS

| | | |
|---|---|---|
| C1-33 Microfarad | C9-.1 | C17-.01 |
| C2-.1 | C10-.1 | C18-.47 |
| C3-.1 | C11-.1 | C19-2 |
| C4-.1 | C12-.1 | C20-2.2 |
| C5-10 | C13-.1 | C21-.47 |
| C6-.1 | C14-1000 | C22-5.6 |
| C7-1 | C15-.47 | C23-1 |
| C8-100 pf | C16-.05 | C24-.01 |

TRANSISTORS

Q1-2N5089 or MM2484 (1)
Q2-2N5089 or MM2484 (1)
Q3-2N5142 (2)

OPERATIONAL AMPLIFIERS

Op Amp 1-μA 741 (2)
Op Amp 2-μA 741 (2)
Op Amp 3-μA 741 (2)
Op Amp 4-CA 3094 T (3)

INTEGRATED CIRCUITS

IC1-μA 723 (2)
IC2-μA 757 (2)

(1) Available from Motorola Semiconductor Products, Inc. Phoenix, Arizona 85036
(2) Available from Fairchild Semiconductor, a division of Fairchild Camera and Instrument Corporation 313 Fairchild Drive Mountain View, California 94040
(3) Available from Radio Corporation of America Electronic Components and Devices Harrison, New Jersey 07029

Although the intrusion detecting system of this invention has been described with respect to a system whereby one transmitting unit is used with a single receiving unit, it will be appreciated that one transmitting unit may be used with multiple receiving units with each of the receiving units used in the particular system being responsive to the same modulation frequency. By way of example, a four-sided perimeter can be kept under surveillance by a system having two transmitting units at two opposite corners of the four corners thereof which emit radiation along two lobes with each lobe being angularly spaced from the other and aligned so as to substantially coincide with respective sides of the perimeter. A receiving unit may be located at each corner of the perimeter which is aligned with a respective one of the transmission pattern lobes of the transmitting units. In this manner, four sides of a perimeter may be kept under surveillance with only two transmitting units and four receiving units.

While it will be apparent that the teachings herein are well calculated to teach one skilled in the art the method of making the preferred embodiment of this invention, it will be appreciated that the invention is susceptible to modification, variation and change without departing from the proper scope of meaning of the subjoined claims.

What is claimed is:

1. An intrusion detecting system for detecting the entrance of an intruder into a zone of protection comprising:
transmitting means for radiating high frequency energy;
receiving means for receiving at least a portion of said radiated high frequency energy including amplifying means for receiving a signal representative of said received portion of said radiated high frequency energy and for providing an output signal, said amplifying means having automatic gain control means for decreasing the gain in response to increases in said received signal at a first rate to maintain said output signal substantially constant and for increasing the gain in response to decreases in said received signal at a second rate to maintain said output signal substantially constant, said first rate being selected to be greater than the rate of increase of said received signal upon the approach of said intruder to said zone of protection, said second rate being selected to be substantially less than said first rate and to be less than the rate of decrease of said received signal upon the entrance of said intruder into said zone of protection so that the response of said receiving means to an intrusion is enhanced by the response of said gain control means to the increase in said received signal upon approach of said intruder to said zone of protection; and means responsive to said output signal for indicating an intrusion.

2. An intrusion detecting system according to claim 1 wherein said received signal represents changes in the amount of said received portion of said high frequency energy.

3. An intrusion detecting system according to claim 1 wherein said first rate is approximately ten times said second rate.

4. An intrusion detecting system according to claim 1 wherein said transmitting means and said receiving means are at spaced locations so that an intrusion intermediate said spaced locations causes a change in said received portion of said high frequency energy.

* * * * *